United States Patent [19]

Crotty, Jr. et al.

[11] 4,444,726
[45] Apr. 24, 1984

[54] QUENCH RING AND DIP TUBE ASSEMBLY FOR A REACTOR VESSEL

[75] Inventors: Joseph M. Crotty, Jr., Long Beach; John M. Veillon, Covina, both of Calif.

[73] Assignee: Texaco Inc., White Plains, N.Y.

[21] Appl. No.: 453,426

[22] Filed: Dec. 27, 1982

[51] Int. Cl.³ .............................................. F28D 21/00
[52] U.S. Cl. ...................................... 422/207; 48/69; 208/48 Q; 261/112; 422/151
[58] Field of Search ................. 422/207, 151; 261/112, 261/153; 208/48 Q; 48/69, 196 R, 197 R, 67; 55/240, 244, 255, 256; 266/146

[56] References Cited

U.S. PATENT DOCUMENTS

| | | | |
|---|---|---|---|
| 2,442,898 | 6/1948 | Maguire | 208/48 Q |
| 2,631,684 | 3/1953 | Schmidt | 261/112 X |
| 2,818,326 | 12/1957 | Eastman et al. | 48/196 R |
| 2,896,927 | 7/1959 | Nagle et al. | 261/112 X |
| 3,208,830 | 9/1965 | Knight et al. | 422/207 |
| 3,526,082 | 9/1970 | Thuillier | 261/112 X |
| 3,775,062 | 11/1973 | Susuki et al. | 422/207 X |
| 3,998,609 | 12/1976 | Crouch et al. | 48/197 R |
| 4,218,423 | 8/1980 | Robin et al. | 261/112 X |

Primary Examiner—Richard L. Chiesa
Attorney, Agent, or Firm—Robert A. Kulason; Robert Knox, Jr.; Henry C. Dearborn

[57] ABSTRACT

In the combination of a reactor vessel which includes a quench ring and a dip tube surrounding a bottom outlet, there is an improved quench ring structure. It includes a first annular cooling conduit mounted against the floor of the reactor chamber and surrounding the outlet. That floor supports a refractory lining. There is a second annular cooling conduit mounted beneath the first conduit. And, there is a high temperature resistant seal between the two conduits. The result maintains a tight seal against escape of high temperature reactor gas, in spite of any warping of the reactor floor.

8 Claims, 3 Drawing Figures

QUENCH RING AND DIP TUBE ASSEMBLY FOR A REACTOR VESSEL

BACKGROUND OF THE INVENTION

1. Field of the Invention

This invention concerns improved structure for a reactor vessel, in general. More specifically, the invention relates to an improvement for the quench ring and dip tube assembly of a reactor vessel employing such structure.

2. Description of the Prior Art

A reactor vessel employing a quench ring and dip tube assembly therewith is known, and one such has been described in a U.S. Pat. No. 4,218,423. However, it has been discovered that in operation, a generator assembly of that type has been prone to seal failure. That is, the seal that was employed between the quench ring and the floor of the generator or gasifier chamber.

The dip tube structure of the type of assembly of concern carries hot combustion gases from the gasifier through a bottom outlet and into the dip tube where quenching takes place in a bath of water into which the dip tube extends. Also, some quenching begins with the aid of water from the quench ring which is directed down on the inside surface of the dip tube. Leakage of the hot gases involved can cause extensive damage to the floor of the gasifier chamber because the temperatures of unquenched gas are much higher than the melting point of the floor metal. Also, the quench chamber itself can, of course, be damaged by such hot gases.

While the cause of the leakage mentioned above is not specifically determined, it has been theorized that the failure is related to the gasifier floor becoming warped because of the high floor temperatures encountered, and especially the temperature gradient with highest temperature at the sides next to the outlet while the outer periphery of the floor is considerably cooler.

Consequently, it is an object of this invention to provide structure for the quench ring that obviates the leakage of any unquenched gases and so overcomes the problem of damage to the reactor structure.

It is another object of the invention to provide for a first quench ring structure attached at the gasifier floor and in addition a second quench ring there-beneath, with a seal arrangement that can withstand the high temperatures encountered.

SUMMARY OF THE INVENTION

Briefly, the invention concerns an improved quench ring and dip tube assembly structure, in combination with a reactor vessel having a refractory lined reactor chamber with a bottom outlet and a floor to support said lining. The assembly comprises a first annular conduit for carrying cooling water therein and adapted for mounting against said bottom outlet and said floor, and a second annular conduit for carrying cooling water therein and adapted for mounting beneath said first annular conduit. In addition, it comprises a dip tube for carrying hot gas and for directing molten slag from said outlet into a bath of quench water there beneath. The said dip tube extends into the quench water to form a liquid seal. It also comprises means for mounting said dip tube surrounding said second annular conduit for receiving cooling water therefrom and directed against the inside of said dip tube to prevent said slag from sticking thereto.

Once more briefly, the invention relates to an improved quench ring and dip tube assembly that is in combination with a reactor vessel having a refractory lined reactor chamber with a bottom outlet and a floor to support said lining. It comprises a first annular conduit for carrying cooling water therein. The conduit has a flat upper surface mounted integrally in contact with said floor and a flat lower surface with a peripheral flange and an annular groove. And, the conduit has at least two connector means for circulating said cooling water in said first annular conduit. It also comprises a second annular conduit for carrying cooling water therein and having a flat upper surface corresponding with said first conduit flat lower surface. And, it has a peripheral flange and an annular groove matching said first conduit annular groove. It also comprises a connector for supplying said cooling water to said second annular conduit, and an annular seal means comprising a metal gasket having high temperature resistance to withstand hot gas leaving said bottom outlet. The said gasket has a polygonal cross section for mating with said annular grooves. It also comprises a pair of split rings each having complimentary shape for cooperating with said peripheral flanges, and each including transverse take-up means. It also comprises means for bolting said split rings axially together after said take-up on the peripheral flanges. And, it comprises a dip tube for carrying hot gases and for directing molten slag from said outlet into a bath of quench water there beneath. The said dip tube extends into the quench water to form a liquid seal. And, the assembly comprises means for mounting said dip tube surrounding said second annular conduit for receiving said cooling water therefrom and directed against the inside of said dip tube to prevent said slag from sticking thereto.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein.

DESCRIPTION OF THE PREFERRED EMBODIMENT

Figure 1:
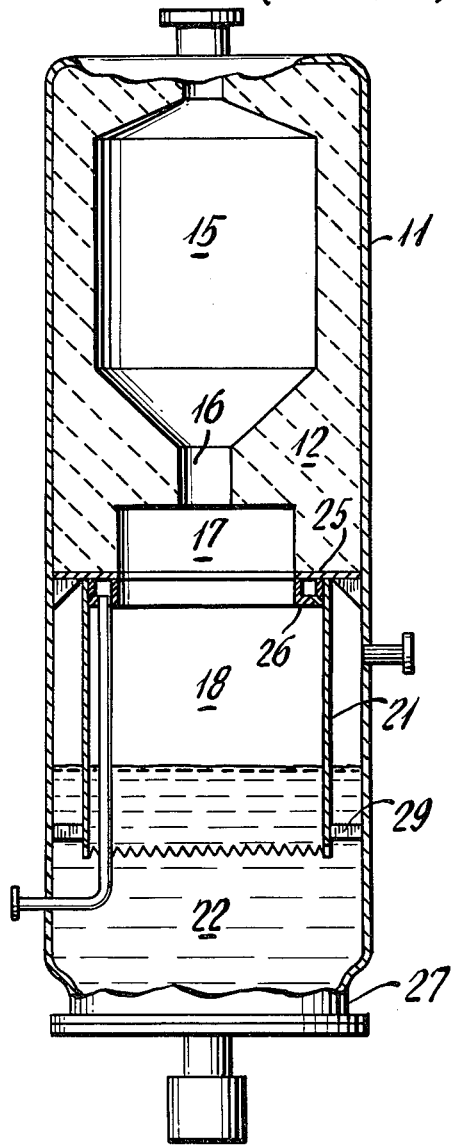
FIG. 1 is a schematic longitudinal cross section illustrating an assembly according to the prior art.

An assembly to which this invention applies is illustrated in FIG. 1. This represents the prior art as described in the aforementioned U.S. Pat. No. 4,218,423. As there shown and described, the basic type of reactor vessel assembly to which this invention applies, has a reactor vessel 11 that has a refractory lining 12 which forms a reactor chamber 15. There is a bottom outlet from the chamber, 15 which outlet includes a narrow throat section 16. And, the outlet continues through an enlarged opening 17 that connects into a space 18 inside a dip tube 21. There is a bath of quench water 22 in the bottom section of the reactor vessel 11.

The refractory lining 12 of the generator is supported by a floor 25 that is cooled by a quench ring 26. The dip tube 21 fits outside of the quench ring 26 and is supported vertically by a number of horizontal braces 29. It may be noted that the dip tube 21 is constructed to slide over the quench ring 26 or, alternatively, to be attached thereto by welding or the like (not shown).

It may be noted also that the dip tube 21 may be mounted by being inserted vertically through a flanged bottom opening 27 of the generator vessel 11, prior to filling with the quench water 22.

Figure 2:
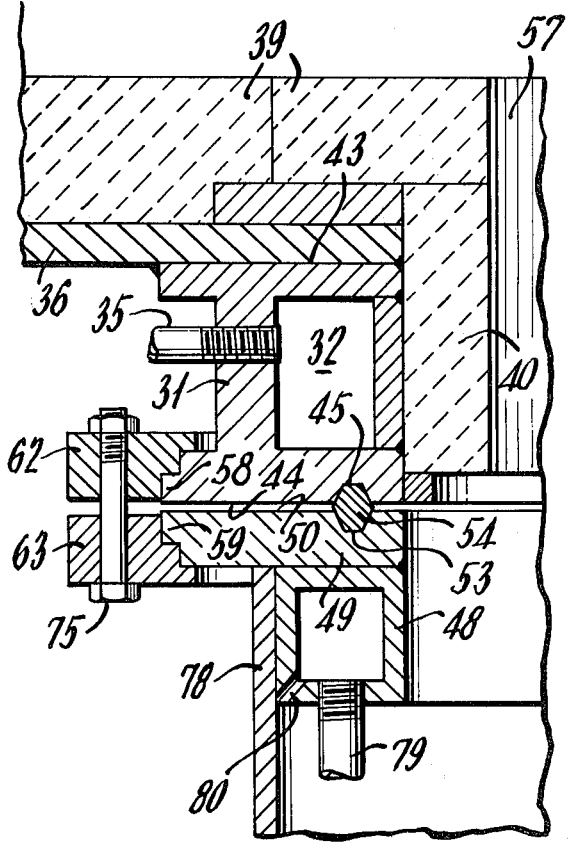
FIG. 2 is an enlarged partial, detailed cross section of an improved quench ring structure according to the invention.
Figure 3:
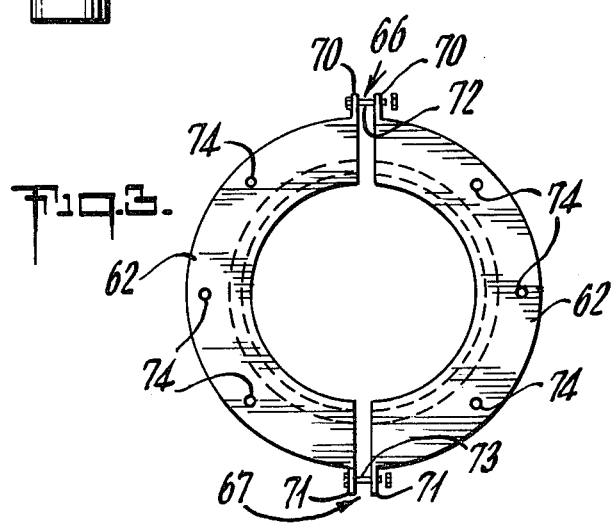
FIG. 3 is a reduced plan view illustrating the split ring clamps that are part of the improved assembly structure.

The improvement is in combination with the above described assembly and it particularly relates to the quench ring structure. The improved structure is illustrated in FIGS. 2 and 3. Thus, in order to overcome the problems of leakage due to the high temperature unquenched gases there is a first annular conduit 31 that carries cooling water in a space 32 therein. For circulating water in the space 32, there are at least two connector elements 35 (only one shown). The conduit 31 is mounted integrally in contact with a floor 36 that corresponds with the floor 25 of the prior art structure illustrated in FIG. 1. The floor 36 supports a lining 39 of refractory material. And, if the molten slag from the gasifier should tend to accumulate on the relatively cool surface of the quench ring conduit 31, there may be included in the reactor lining 12 of the vessel 11, a refractory material sleeve 40 that reaches down over most of the inside surface of the conduit 31.

The conduit 31 has a flat upper surface 43 that is mounted in integrally intimate contact with the floor 36, for example by means of welding as illustrated. The conduit 31 also has a flat lower surface 44. And, there is an annular groove 45 in the lower surface 44.

The invention also includes a second annular conduit 48 that has an upper section 49 with a flat upper surface 50. This upper surface 50 corresponds in size and shape to the flat lower surface 44 of the conduit 31. There is an annular groove 53 which matches the groove 45 in the conduit 31. These grooves 45 and 53 are shaped to accommodate a polygonal shaped metallic gasket 54. Gasket 54 is constructed of material that has high temperature resistance to withstand the hot gases leaving a bottom outlet 57 of a generator assembly structure according to this invention.

Each of the annular conduits 31 and 48 has a correspondingly located flange 58 and 59 respectively. These flanges are integral parts of the conduits and are located on the outer periphery of each. They are employed in attaching the conduits together.

A pair of split rings 62 and 63 have complimentary shapes on the inner periphery of each for cooperating with the flanges 58 and 59 of the conduits 31 and 48. The split rings each have transverse take-up means 66 and 67. These might take various forms, but are illustrated as integral flanges 70 and 71 that extend diametrically from the body of each split ring. See FIG. 3 which shows a plan view of split ring 62, the two halves of which have opposed flanges 70 diametrically opposite the other opposed flanges 71. It will be appreciated that the take-up means 66 and 67 each include holes (not shown) for accepting short bolts 72 and 73 that bolt the flanges 70 and 71 respectively together to accomplish the take-up function.

In the split rings 62 and 63, there are a plurality of bolt holes 74 located in corresponding positions around the split rings (see FIG. 3). These holes 74 are aligned so that the split rings 62 and 63 may be bolted together after the take-up function. Split rings 62 and 63 are thus clamped together by a plurality of bolts such as a bolt 75 that is illustrated in FIG. 2.

Of course, the whole assembly according to the invention includes a dip tube 78 that fits over the outside of the lower portion of the conduit 48. This may be done in a manner similar to that of the prior art structure that was described in connection with FIG. 1. And, there is a connector 79 for supplying cooling water to the interior of the conduit 48. From there the water flows out onto the inside surface of the diptube 78 in any desired manner, e.g. by a plurality of passages 80 which may be like those described in the prior art structure which is set forth in the foregoing U.S. patent.

While the foregoing description of the invention has been set forth in considerable detail in accordance with the applicable statues, this is not to be taken as in any way limiting the invention but merely as being descriptive thereof.

We claim:

1. Improved quench ring and dip tube assembly in combination with a reactor vessel having a refractory lined reactor chamber with a bottom outlet and a floor to support said lining, comprising
    a first annular conduit for carrying a first supply of cooling water therein and adapted for mounting against said bottom outlet and said floor,
    a second annular conduit for carrying a second supply of cooling water therein and adapted for mounting beneath said first annular conduit,
    said first and second annular conduits are mounted in said reactor such that the cooling water carried by said first and second annular conduits do not contact one another in said reactor vessel,
    a dip tube for carrying hot gas and for directing molten slag from said outlet into a bath of quench water therebeneath, said dip tube extending into the quench water to form a liquid seal, and
    means for mounting said dip tube surrounding said second annular conduit for receiving cooling water therefrom and directed against the inside of said dip tube to prevent said slag from sticking thereto.

2. Improved quench ring and dip tube assembly according to claim 1, further comprising
    annular seal means adapted for mounting between said first and second annular conduits,
    said annular seal means being high temperature resistant to prevent leakage of hot gas leaving said bottom outlet.

3. Improved quench ring and dip tube assembly according to claim 2, wherein
    said first annular conduit comprises flat upper and lower surfaces,
    said flat upper surface being mounted in contact with said floor, and
    connector means for circulating said cooling water therein.

4. Improved quench ring and dip tube assembly according to claim 3, wherein
    said second annular conduit comprises a flat upper surface for mating with said flat lower surface of said first annular conduit.

5. Improved quench ring and dip tube assembly according to claim 4, further comprising
    means for clamping said first and second annular conduits together with said annular seal means therebetween.

6. Improved quench ring and dip tube assembly according to claim 5, wherein said means for clamping comprises a pair of split rings each having transverse take-up means, and means for bolting said split rings axially together after said take-up on each of said first and second annular conduits.

7. Improved quench ring and dip tube assembly according to claim 6, wherein said annular seal means comprises a metallic gasket, and matching grooves in said mating flat upper and lower surfaces for receiving said gasket.

8. Improved quench ring and dip tube assembly in combination with a reactor vessel having a refractory lined reactor chamber with a bottom outlet and a floor to support said lining, comprising a first annular conduit for carrying a first supply of cooling water therein and having a flat upper surface mounted integrally in contact with said floor and a flat lower surface with a peripheral flange and an annular groove, at least two connector means for circulating said cooling water in said first annular conduit, a second annular conduit for carrying a second supply of cooling water therein and having a flat upper surface corresponding with said first conduit flat lower surface and having a peripheral flange and an annular groove matching said first conduit annular groove, said first and second annular conduits are mounted in said reactor such that the cooling water carried by said first and second annular conduits do not contact one another in said reactor vessel, a connector for supplying said cooling water to said second annular conduit, annular seal means comprising a metallic gasket having high temperature resistance to withstand hot gas leaving said bottom outlet, said gasket having a polygonal cross section for mating with said annular grooves, a pair of split rings each having complimentary shape for cooperating with said peripheral flanges and each including transverse take-up means, means for bolting said split rings axially together after said take-up on said peripheral flanges, a dip tube for carrying hot gas and for directing molten slag from said outlet into a bath of quench water therebeneath, said dip tube extending into the quench water to form a liquid seal, and means for mounting said dip tube surrounding said second annular conduit for receiving said cooling water therefrom and directed against the inside of said dip tube to prevent said slag from sticking thereto.

* * * * *